United States Patent Office 3,009,000
Patented Nov. 14, 1961

3,009,000
PROCESS FOR THE MANUFACTURE OF ALKALI AND ALKALINE EARTH METAL DERIVATIVES OF ORGANIC COMPOUNDS
Jean D'Ans, Berlin-Steglitz, and Heinrich Gold, Berlin, Germany, assignors to Ethyl Corporation, New York, N.Y., a corporation of Delaware
No Drawing. Filed July 11, 1958, Ser. No. 747,823
Claims priority, application Germany July 16, 1957
8 Claims. (Cl. 260—665)

This application relates to the manufacture of alkali and alkaline earth metal compounds and in particular to the manufacture of such derivatives of organic compounds wherein the organic radicals contain reactive groups.

As chemical intermediates, it is frequently desirable to transform hydrogen-containing organic compounds into the corresponding alkali or alkaline earth metal derivatives as a step in further transforming said compounds into useful end products. This general procedure has general applicability, but the direct reaction of such acidic hydrogen with the metals themselves has largely been limited to those organic compounds free of groups, radicals or functions reactive with the metal. Thus, certain general and broadly applicable reactions involving acidic hydrogen transformations cannot be applied when such reactive groups are also contained in the molecule.

It is an object, therefore, of this invention to provide an improved process for the preparation of alkali and alkaline earth metal derivatives of organic compounds containing acidic hydrogen.

It is a further object of this invention to manufacture metal derivatives of compounds not susceptible of direct preparation by previously known methods. These and other objects of the invention will become more apparent from the further description hereinafter.

In general, the process of this invention comprises the reaction of saline hydrides with organic compounds of acid character containing other functional groups, sensitive to treatment with alkali metals. In particular, the process of this invention comprises reacting alkali metal hydrides and alkaline earth metal hydrides, that is, hydrides of the metals of group I-A and group II-A of the periodic charts of the elements (Fisher Scientific Co., 1955) with organic compounds containing hydrogen atoms directly replaceable by alkali metals and which additionally contain functional substituents, normally reactive with alkali metals, under anhydrous conditions, whereby only said hydrogen atoms are reacted. The process of this invention can be conducted with the metal hydrides in the solid state, in a dissolved state or as a melt.

The saline derivatives of organic compounds are normally prepared by the reaction of the appropriate organic substance containing an acid hydrogen with the corresponding hydroxide or amide in solution or suspension. If anhydrous salts of such compounds are desired, it is normally required to remove the water of the reaction by vaporization or other means. A secondary advantage of the process of this invention resides in the formation only of molecular hydrogen as a byproduct, permitting the direct preparation of the anhydrous product. Despite the formation of this hydrogen byproduct when employing the reactants of this invention, there is no reduction of the functional groups present even when a multiplicity of functional groups occurs in the molecule. In general, the presence of several functional groups in a single molecule causes a loosening of the bond structure which in turn facilitates and promotes the occurrence of said reactions. For example, the reaction of polyhydric phenols with alkali metals result in the formation of phenoxy phenolates, while by the process of the invention stant application smooth reaction to the desired phenolate is achieved. Similar considerations apply when the alkali metal amides are employed, wherein certain functional groups undergo amidation and similar undesirable side reactions.

In general, materials best suited to provide the advantages of the present invention comprise those organic compounds containing one or more acid hydrogen atoms, that is replaceable by metals, and in addition contain other functional groups wherein the reactivity is not dependent upon acidic hydrogen or an olefin linkage. By acidic hydrogen is intended to be included, in addition to the classical definition, those compounds which owe their acid character to keto-enol tautomerism or other corresponding conversion.

In addition the reactants employed in this process include functionally substituted heterocyclic compounds with reactive-metal replaceable hydrogen. Another class of suitable compounds includes those containing replaceable hydrogen bonded to carbon, such as acetylenes, cyclopentadienes and homologs of such compounds. Among those compounds containing acidic hydrogen by virtue of rearrangement, the normal behavior under the influence of alkali metals is to undergo conversion reactions causing deep-seated changes in the molecule. In the process of this invention the primary, and usually quantitative, reaction is replacement of said acidic hydrogen with a saline metal, that is an alkali or alkaline earth metal and the concurrent production of molecular hydrogen, without reduction or other conversion occurring.

Among the simple acidic hydrogen-containing compounds containing other functional groups which can be employed in the process of the present invention are alcohols, thioalcohols, phenols, thiophenols, sulfonic acids, sulfinic acids, sulfonamides, carboxylic acids, acid amides, acid hydrazides, primary and secondary aliphatic nitro compounds, mono-substituted hydroperoxides, acetylenes, cycloolefins and peracids.

Among the groups enumerated above, certain compounds are preferred for the practice of the present invention, and produce the desired products despite the fact that, in general, the metal hydrides employed in the present invention are considered to be strong reducing agents. Thus, the aliphatic nitro compounds, normally reduced by alkali metals in their aci-form, are smoothly converted to the aci-N-sodium compounds. A further preferred group in the practice of the present invention comprises the hydroperoxides and peracids. These latter classes of compounds are immediately reduced by alkali metals to the simple organic carboxylic salts or alcoholates. By the process of the present invention these materials are quantitatively converted to the metal salt of the oxidized form of the reactants. A still further preferred class of compounds useful in the present invention comprises cyclic olefins containing a nuclear hydrogen replaceable by sodium and also containing halogen atoms normally reactive to sodium. Thus, chlorocyclopentadienyl compounds are particularly preferred.

Numerous organic compounds containing hydrogen atoms of acid character, but no other functional groups as, for example, polynuclear phenols, also react smoothly with salt-like metal hydrides, whereas side effects occur in their reaction with the corresponding metals. Salt formation with the alkali metals proceeds smoothly only for a few of the simpler compounds. Even the monohydric naphthols, for example, react to produce an unsatisfactory yield of the desired product with concurrent condensation of the aromatic nuclei. Conditions are not very different for the corresponding heterocyclic compounds with which the reaction of metals leads readily to hydrogenation of the nucleus, whereas the action of alkali metal amides leads to amidation and specifically to the formation of nitrogen-containing compounds. With all these compounds the salt-like metal hydrides react smoothly and efficiently under normal reaction conditions.

In their reactions with organic compounds containing reactive hydrogen, the metal hydrides are distinguished from the metals by their greater reactivity. This permits a considerably lower reaction temperature for comparable reactions. However, selective behavior with respect to reactive hydrogen groups is exhibited by the salt-like hydrides.

In the case where secondary reactions following normal salt formation cannot be carried out with a compound which for its part cannot be made to react with the salt-like hydrides used, such secondary reaction can be carried out in a single process simultaneously with the salt formation reaction. The compound required for the second reaction can be added to the original reactant mixture.

In addition to the preparation of useful chemical intermediates, the reaction between the salt-like hydrides and the "acid" hydrogen atoms of organic compounds proceeds so smoothly that it can serve for the identification and in many cases for the quantitative determination of such hydrogen atoms.

In general, the process of the instant invention proceeds readily and smoothly with hydrogen evolution at a relatively low temperature. Thus, in the majority of instances high temperatures, destructive to the other functional groups present in the reactants, can be avoided. However, where desirable for rapid reaction of those compounds which are thermally stable, somewhat higher temperature can be employed. Thus, in general, temperatures in the range of between about −20° C. to 200° C. can be employed. The primary limitation on temperature is the consideration of the stability of the organic reactant and the decomposition temperature of the metal hydride employed. The upper practical limit to be employed in the present invention thus is the lower of the two aforementioned temperatures.

In general, the process of this invention is conducted in the presence of a solvent for one of the reactants. Among the preferred solvents are the ethers of which the cyclic and poly ethers are particularly preferred. In many instances the products produced by this process are soluble in such solvents and the reaction is thereby enhanced. Among the cyclic ethers an especially preferred example is tetrahydrofuran. Frequently in tetrahydrofuran a difference in behavior is sometimes noted, depending upon the metal appearing in the product. For example, with the lithium salt of thiophenol, solubility is sufficient to maintain the product in solution. On the other hand, with the corresponding sodium salt, the solubility is slight and the product precipitates nearly quantitatively during the reaction, and separation of the reaction product in solid form does not effect adversely the course of the reaction. It is thus possible by proper choice of solvents or saline hydride to obtain a solid or dissolved reaction product.

Among the poly ethers which are sometimes preferred in the process of this invention can be cited the dialkyl alkylene ethers and the dialkyl polyalkylene ethers. Typical examples of such ethers are dimethyl ether of ethylene glycol, diethyl ether of ethylene glycol, methyl ethyl ether of ethylene glycol and other lower alkylene ethers having up to about 6 carbon atoms in each alkyl group. Typical of the polyalkylene ethers can be included dimethyl diethylene glycol, diethyl diethylene glycol, methyl ethyl diethylene glycol and the corresponding polypropylene glycol ethers. In general among the polyalkylene glycol ethers the alkyl groups can contain from 1 to about 6 carbon atoms and the alkylene groups from 2 up to about 4 carbon atoms while, in general, the polyalkylene chain can be dimers, trimers and tetramers thereof.

In employing the above solvents it is frequently possible to accelerate an otherwise sluggish reaction of the saline hydride with the acidic material by incorporating in the reaction medium a small amount of an alcohol. For this purpose the simple lower aliphatic alcohols having from 2 to 8 carbon atoms are employed. Thus, methanol, ethanol, propanol, isopropanol, the butanols and the octyl alcohols can be employed with accelerating results.

In general, the alkali metal and alkaline earth metal hydrides are sensitive to oxygen and moisture and for this reason it is preferred to employ an inert atmosphere in the reaction system. Thus, useful gases for this purpose include nitrogen, hydrogen and the rare gases such as helium, argon, and the like.

Among the specific metal hydrides useful in the present invention are the group IA alkali metal hydrides including lithium hydride, sodium hydride, potassium hydride, rubidium hydride, cesium hydride and francium hydride and of these lithium, sodium and potassium hydrides are preferred. Among the group IIA alkaline earth hydrides employed in the process of the instant invention are beryllium hydride, magnesium hydride, calcium hydride, strontium hydride, barium hydride and of these the beryllium and calcium hydrides are preferred.

Among the alcohols suitably used as reactants in the present invention are the aliphatic alcohols having from 1 to about 18 carbon atoms and containing as substituents halogen, that is fluorine, chlorine, bromine, iodine, nitro groups, amine groups, hydroxyl amine groups, and carbonyl groups in the chain. Examples of such compounds include ethylene chlorohydrin, 4-bromobutanol, epichlorhydrin, β-nitro ethanol, ethanol amine, and β-keto propanol. Corresponding thioalcohols can also be employed in the present invention. Similarly the aliphatic sulfonic acids, sulfinic acids, sulfonic amides, carboxylic acids, acid amides, acid hydroxy acids and primary and secondary aliphatic nitro compounds can be so substituted.

Among the aryl compounds containing acid hydrogen atoms in the foregoing listing the aromatic nucleus can likewise be substituted with halogen atoms, that is fluorine, chlorine, bromine and iodine and be further substituted with acyl groups, carbethoxy groups and smoothly produce the corresponding salts in accordance with this invention.

In order to further illustrate the process of this invention the following examples show typical reactions of the process of this invention. In these examples all parts and percentages are by weight unless otherwise noted.

*Example I*

To a reaction vessel provided with means for agitation and addition of liquid reactants, and means for cooling the reaction mixture, was added 24 parts of sodium hydride in 500 parts by volume of tetrahydrofuran. While agitating to maintain the sodium hydride in suspension a solution of 163 parts of trichloroacetic acid dissolved in 500 parts by volume of tetrahydrofuran was added at such a rate to maintain the reaction temperature between 0 and 25° C. The resulting clear solution contained, in quantitative yield, sodium trichloroacetate.

In a similar manner when lithium hydride, calcium hydride or beryllium hydride were so reacted with trichloroacetic acid the corresponding lithium, calcium and beryllium trichloroacetates were quantitatively recovered. When employing calcium hydride, the calcium trichloroacetate was precipitated from the reaction system and was recovered by filtration.

*Example II*

In accordance with the procedure of Example I, 48 parts of sodium hydride was suspended in 500 parts by volume of tetrahydrofuran and, while maintaining the suspension by agitation, 179 parts of 4,6-dichlororesorcinol dissolved in 800 parts by volume of tetrahydrofuran was added, maintaining the temperature at about 25° C. Upon completion of the addition the reaction mixture was heated gently until precipitation of the product was complete. This product, the disodium salt of 4,6-dichlororesorcinol was recovered in nearly quantitative yield.

Repeating the above procedure by employing only 24 parts of sodium hydride the monosodium salt of 4,6-dichlororesorcinal was obtained in essentially quantitative yield.

*Example III*

Following the procedure of Example I without external cooling 173 parts of 2-bromophenol dissolved in 500 parts by volume of tetrahydrofuran was reacted with 24 parts of sodium hydride suspended in 500 parts by volume of tetrahydrofuran. The reaction proceeded smoothly to produce a clear solution containing the theoretical quantity of sodium 2-bromophenolate.

*Example IV*

A suspension was prepared as in Example I employing 10 parts of lithium hydride in 1000 parts by volume of tetrahydrofuran. To this was added continuously 490 parts pentabromophenol dissolved in 2000 parts of tetrahydrofuran until a clear solution was obtained. This solution contained a small amount of excess lithium hydride which was removed by filtration. To demonstrate that the reaction did not result in any byproduct bromide salt, a portion of the above solution was extracted with water and the resulting aqueous extract, when treated with nitric acid and silver nitrate, gave no precipitation of silver bromide.

*Example V*

In accordance with the procedure of Example I, 250 parts of sodium hydride in 3000 parts by volume of tetrahydrofuran was reacted with 1970 parts of 2,4,5-trichlorophenol dissolved in 7000 parts by volume of tetrahydrofuran. The phenol was added without cooling to produce a vigorous evolution of hydrogen. A clear solution of the sodium salt of 2,4,5-trichlorophenol was obtained containing a small excess of sodium hydride. The product can be recovered either by filtering the sodium hydride from the reaction solution or addition of trichlorophenol can be added to just dissolve the last trace of sodium hydride.

*Example VI*

To a suspension of 3 parts of sodium hydride and 100 parts by volume of tetrahydrofuran was added rapidly a solution of 30 parts of 5,7-dibromo-8-hydroxyquinoline in 1000 parts of tetrahydrofuran. A clear, yellow solution of the sodium salt of 5,7-dibromo-8-hydroxyquinoline resulted and can be used in subsequent reaction in this form. On storage the solution darkens to some extent in the dark and more rapidly when exposed to light.

*Example VII*

In accordance with the procedure of Example I, 170 parts of 2-hydroxybenzoic acid ethyl ester in 600 parts by volume of tetrahydrofuran was quantitatively reacted with 25 parts of sodium hydride suspended in 900 parts by volume of tetrahydrofuran while maintaining the reaction mixture at a temperature near 0° C. The product obtained in quantitative yield comprised a clear, pale yellow solution of 2-carbethoxy sodium phenoxide.

In a similar fashion the above ethyl ester, when reacted with calcium hydride or magnesium hydride suspended in the dimethyl ether of ethylene glycol produces substantially quantitative yields of the corresponding calcium and magnesium phenolates which in this instance precipitate from solution.

*Example VIII*

To the reaction vessel of Example I containing a suspension of 12 parts of sodium hydride in 200 parts by volume of tetrahydrofuran was added cautiously a solution of 300 parts of tetrahydrofuran and 74 parts of 4-nitrophenol. Hydrogen evolution occurred and a deep yellow aci-N-sodium salt formed as a voluminous crystal precipitate only slightly soluble in tetrahydrofuran. Upon recovery by filtration a substantially quantitative yield was obtained.

*Example IX*

A solution of 61 parts of nitromethane was dissolved in 500 parts of peroxide-free diethyl ether. This solution was added to a suspension of 24 parts of sodium hydride in 250 parts by volume of peroxide-free diethyl ether at such a rate and under such reflux conditions that the hydrogen evolution was completely controlled. After the addition was complete and hydrogen evolution had ceased the aci-N-sodium compound of nitromethane was obtained as a colorless solid compound which became crystalline upon additional heating. In this reaction there was no evidence of reduction to the corresponding amine.

*Example X*

25 parts of sodium hydride was suspended in 300 parts by volume of tetrahydrofuran and the reaction vessel was carefully blanketed with nitrogen gas. To this suspension was added a solution of 145 parts of β-naphthol dissolved in 700 parts by volume of tetrahydrofuran under conditions of Example I. A clear solution of sodium β-naphthol was obtained which was stable when stored under nitrogen. Decomposition of the resulting solution with aqueous acid recovered the β-naphthol unchanged and in quantitative yield.

*Example XI*

A quantitative yield of the lithium salt of thiophenol dissolved as a pale yellow solution in tetrahydrofuran was obtained as a result of the addition of 11 parts of thiophenol dissolved in 20 parts of tetrahydrofuran to a suspension of 0.8 part of lithium hydride suspended in 20 parts by volume of tetrahydrofuran.

*Example XII*

In a reaction vessel equipped with means for agitation and applying heat externally was placed a mixture of 40 parts of fluorene with 2.4 parts of powdered sodium hydride. While agitating the mixture heat was applied to the reaction vessel until the mixture reached the melting point. Rapid formation of the fluorenyl sodium began as the temperature approached the melting point of the fluorene, that is 115° C. As the temperature reached 130 to 140° C. a more vigorous reaction occurred and a dark brown flocculent precipitate of fluorenyl-9-sodium separated from the melt. After the evolution of hydrogen had ceased the melt was cooled below a temperature of 80° C. and extracted with benzene. The benzene solution containing excess fluorene was separated and the fluorenyl-9-sodium was recovered by filtration as the solid residue. The fluorene extracted was recovered by vaporization of the benzene and was available for recycle.

*Example XIII*

10 parts by volume of an acetic acid peracid containing 76 weight percent of the acylhydroperoxide was dissolved in sufficient tetrahydrofuran to form a solution containing a total of 100 parts by volume. To this solution was added with agitation gradually 1.7 parts of finely powdered calcium hydride. A vigorous reaction occurred with evolution of hydrogen. The solid product was removed from suspension by filtration. The filtrate comprised a clear solution of tetrahydrofuran and 95 percent of the original acetic acid peracid. This filtrate was added gradually to a suspension of 2 parts of finely powdered calcium hydride slurried in tetrahydrofuran while cooling the reaction mixture to about 20° C. Upon cessation of the evolution of hydrogen the clear solution resulting was free of acetic acid peracid.

The solid product remaining comprised the calcium salt of acetic acid peracid in colorless crystalline form. This material, recovered by filtration, was dissolved in dilute excess sulfuric acid to permit recovery of over 90 percent of the acetic acid peracid.

*Example XIV*

10 parts by volume of the acetic acid peracid described in Example XIII was dissolved in sufficient ether to provide a solution having a total volume of 100 parts. This solution was freed of water and acetic acid as in Example XIII by treatment with calcium hydride. After filtration of the precipitated calcium salt, the clear filtrate was added to a suspension of 2.28 parts of sodium hydride slurried in a small amount of ether. During the vigorous reaction the mixture was cooled to maintain the temperature between 0 and 20° C. A colorless solution of the sodium salt of acetic acid peracid was obtained in substantially quantitative yield. The stability of this sodium salt depends largely upon the purity of the reagents and the solvent employed. By rigorous extraction of such impurities a stable material is obtained in substantially quantitative yield.

*Example XV*

A slurry of 160 parts of sodium hydride in a small amount of pure anhydrous ether was treated all at once with a solution of 821 parts of tetralinhydroperoxide dissolved in 5000 parts of pure ether. Upon agitation of the mixture while maintaining the temperature at about 25° C. a smooth gentle reaction took place. The reaction was complete when the hydroperoxide was no longer visible in the clear solution resulting, and upon the cessation of hydrogen evolution. Upon further cooling the sodium salt of tetralinhydroperoxide separated as a colorless crystalline precipitate in quantitative yield.

*Example XVI*

Freshly prepared tetrachloro cyclopentadiene in the amount of 204 parts was dissolved in 700 parts by volume of tetrahydrofuran. This solution was added gradually to a suspension of 24 parts of sodium hydride in 300 parts by volume of tetrahydrofuran, while maintaining the reaction under a blanket of nitrogen. During the reaction, as evidenced by hydrogen evolution, external cooling was applied to maintain the temperature below 30° C. The product, tetrachlorocyclopentadienyl sodium, was obtained in nearly quantitative yield.

*Example XVII*

The suspension and solution described in the foregoing example were reacted in the reverse order, that is the slurry of sodium hydride was added to the solution of tetrachlorocyclopentadiene. Substantially identical results were obtained.

*Example XVIII*

A solution of 204 parts of tetrachlorocyclopentadiene in 1000 parts of tetrahydrofuran was prepared and cooled to a temperature of about −20° C. While agitating and maintaining the solution at this temperature 24 parts of powdered sodium hydride was added at once. While continuing the agitation the reaction mixture was warmed to a temperature of about 25° C. at such a rate as to provide a controlled evolution of hydrogen. Upon completion of the hydrogen evolution the reaction ceased and the 1,2,3,4-tetrachloro-5-sodiocyclopentadiene was recovered in quantitative yield.

We claim:

1. A process for the manufacture of halocyclopentadienyl sodium compounds comprising the reaction of sodium hydride with a halocyclopentadiene in the presence of a cyclic ether.

2. A process for the manufacture of sodium trichloroacetate comprising the reaction of sodium hydride with trichloroacetic acid in the presence of tetrahydrofuran.

3. A process for the manufacture of the lithium salt of thiophenol comprising the reaction of lithium hydride with thiophenol in the presence of tetrahydrofuran.

4. A process for the manufacture of tetrachlorocyclopentadienyl sodium comprising the reaction of sodium hydride with tetrachloro cyclopentadiene in the presence of tetrahydrofuran.

5. A process for the manufacture of alkali metal and alkaline earth metal derivatives of alcohols which comprises reacting a hydride selected from the group consisting of alkali metal hydrides and alkaline earth metal hydrides with an alphatic alcohol having from one to about eighteen carbon atoms and containing a substituent selected from the group consisting of fluorine, chlorine, bromine, iodine, nitro, amino, hydroxylamino and carbonyl groups.

6. The process of introducing a substituent selected from the group consisting of the alkali metals and the alkaline earth metals into an organic compound which comprises reacting a hydride selected from the group consisting of alkali metal hydrides and alkaline earth metal hydrides with an organic compound characterized by containing at least one hydrogen atom sufficiently acidic to be replaceable by an alkali metal and by having additionally substituted thereon a functional substituent normally reactive under anhydrous conditions with an alkali metal.

7. The process of claim 6, wherein a cyclic ether solvent is employed.

8. The process of introducing a substituent selected from the group consisting of the alkali metals and the alkaline earth metals into an organic compound which comprises reacting a hydride selected from the group consisting of alkali metal hydrides and alkaline earth metal hydrides with an organic compound characterized by containing at least one hydrogen atom sufficiently acidic to be replaceable by an alkali metal and by having additionally substituted thereon a functional substituent normally reactive under anhydrous conditions with an alkali metal, said process being carried out in a solvent selected from the group consisting of the dialkyl ethers of ethylene glycol, of propylene glycol, of butylene glycol, of diethylene glycol, of dipropylene glycol, of dibutylene glycol, of triethylene glycol, of tripropylene glycol, of tributylene glycol, of tetraethylene glycol, of tetrapropylene glycol, and of tetrabutylene glycol wherein the alkyl groups contain from one to about six carbon atoms.

References Cited in the file of this patent

UNITED STATES PATENTS

| | | |
|---|---|---|
| 2,771,495 | Pines et al. | Nov. 20, 1956 |
| 2,848,506 | Breslow | Aug. 19, 1958 |
| 2,849,508 | Pines | Aug. 26, 1958 |